US007039417B2

(12) United States Patent
Lyle et al.

(10) Patent No.: US 7,039,417 B2
(45) Date of Patent: May 2, 2006

(54) APPARATUS, SYSTEM, AND METHOD FOR MITIGATING ACCESS POINT DATA RATE DEGRADATION

(75) Inventors: Ruthie D. Lyle, Durham, NC (US); Jamel Pleasant Lynch, Jr., Carrboro, NC (US); Scott W. Reid, Cary, NC (US); William Vigilante, Jr., Scranton, PA (US)

(73) Assignee: Lenovo Pte Ltd, Singapore (SG)

( * ) Notice: Subject to any disclaimer, the term of this patent is extended or adjusted under 35 U.S.C. 154(b) by 223 days.

(21) Appl. No.: 10/670,639

(22) Filed: Sep. 25, 2003

(65) Prior Publication Data

US 2005/0070294 A1    Mar. 31, 2005

(51) Int. Cl.
*H04Q 7/20* (2006.01)
(52) U.S. Cl. .................. 455/452.2; 455/63.1; 455/450; 455/452.1; 455/455; 370/252; 370/329; 370/332; 370/333
(58) Field of Classification Search ................ 455/450, 455/452.1, 452.2, 453, 455; 370/252, 329, 370/332, 333
See application file for complete search history.

(56) References Cited

U.S. PATENT DOCUMENTS

| 5,048,057 A | 9/1991 | Saleh et al. ............... 375/40 |
| 5,546,397 A | 8/1996 | Mahany ..................... 370/85.1 |
| 5,696,903 A | 12/1997 | Mahany .................. 395/200.58 |
| 5,732,077 A | 3/1998 | Whitehead ................. 370/349 |
| 5,933,420 A | 8/1999 | Jaszewski et al. .......... 370/329 |

(Continued)

FOREIGN PATENT DOCUMENTS

| EP | 1 257 090 A | 11/2002 |
| EP | 1257090 | 11/2002 |
| EP | 1257091 | 11/2002 |
| WO | WO 0180500 | 10/2001 |

OTHER PUBLICATIONS

Broadband Radio Access Network (BRAN); HIPERLAN Type2; Data Link Control (DLC) Layer, Part2: Radio Link Control (RLC) sublayer.

(Continued)

*Primary Examiner*—George Eng
*Assistant Examiner*—Dai Phuong
(74) *Attorney, Agent, or Firm*—Kunzler & Associates (57) ABSTRACT

A process, system, and apparatus are disclosed for mitigating access point data rate degradation with respect to a wireless communication between a wireless access point and a wireless client device. A channel assessment module is configured to assess the wireless communications, including interference signals, present on available wireless communications channels. The channel assessment module may establish quality parameters that at least partially describe the wireless communications quality of a given channel. A channel selection module is configured to select a best wireless communications channel based on the communications channel assessment. A channel connection module is configured to facilitate wireless communication between the wireless access point and the wireless client device on the best wireless communications channel.

33 Claims, 8 Drawing Sheets

U.S. PATENT DOCUMENTS

| | | |
|---|---|---|
| 6,208,629 B1 | 3/2001 | Jaszewski et al. ........... 370/329 |
| 6,377,608 B1 | 4/2002 | Zyren ......................... 375/132 |
| 6,456,848 B1 | 9/2002 | Freeman et al. ............. 455/450 |
| 6,470,047 B1 | 10/2002 | Kleinerman et al. ........ 375/232 |
| 2002/0176437 A1* | 11/2002 | Busch et al. ................. 370/437 |
| 2002/0181417 A1* | 12/2002 | Malhotra et al. ............ 370/329 |
| 2003/0003933 A1* | 1/2003 | Deshpande et al. ......... 455/510 |
| 2003/0107512 A1 | 6/2003 | McFarland et al. ......... 342/159 |
| 2004/0114546 A1* | 6/2004 | Seshadri et al. ............ 370/310.2 |
| 2004/0152447 A1* | 8/2004 | McDonnell et al. ........ 455/411 |

OTHER PUBLICATIONS

S. Choi er al, Transmitter Power Control (TPC) and Dynamic Frequency Selection (DFS) Joint Proposal for 802.11h WLAN, Mar. 12, 2001.

PCT International Search report.

\* cited by examiner

FIG. 11

APPARATUS, SYSTEM, AND METHOD FOR MITIGATING ACCESS POINT DATA RATE DEGRADATION

BACKGROUND OF THE INVENTION

1. Field of the Invention

This invention relates to wireless networking and more particularly to mitigating data rate degradation of wireless communications between a wireless access point and a wireless client.

2. Description of the Related Art

Wireless local area networks (WLANs) are being established throughout the world to allow users to connect to a network or to the Internet via a network. Schools, businesses, governments, and even individuals are setting up wireless networks that allow multiple users to access a wireless network using laptop computers, personal digital assistants (PDAs), workstations, printers, and many other networking devices. Additionally, many of these wireless networks are available indoors and outdoors, making it possible to connect to a wireless network in virtually any location.

Conventional wireless networks are typically implemented using an international wireless standard established by the Institute of Electrical and Electronic Engineers (IEEE). The standard, IEEE 802.11, defines various transmission protocols that may be employed to transmit network information via a wireless local area network. Generally, the IEEE 802.11 standard is implemented in the 2.45 GHz industrial, scientific and medical (ISM) band that is between 2.4 and 2.5 GHz. Other ISM bands, such as around 5.8 GHz, may also be used.

Within the 2.45 GHz ISM band, multiple channels are designated for WLAN transmissions. The 802.11b specification allows up to 14 channels. For example, the United States and Canada use 11 channels. In contrast, Japan uses 14 channels. The channels are defined between 2.412 and 2.477 GHz in 5 MHz increments, as indicated in Table 1.

TABLE 1

| 802.11b Channels | |
| --- | --- |
| Channel | Frequency |
| 1 | 2.412 |
| 2 | 2.417 |
| 3 | 2.422 |
| 4 | 2.427 |
| 5 | 2.432 |
| 6 | 2.437 |
| 7 | 2.442 |
| 8 | 2.447 |
| 9 | 2.452 |
| 10 | 2.457 |
| 11 | 2.462 |
| 12 | 2.467 |
| 13 | 2.472 |
| 14 | 2.477 |

In most instances, a wireless local area network (WLAN) includes a network server communicating with a wireless access point. The wireless access point is typically hardwired to the network server, using, for instance, twisted-pair, coaxial, or fiber optic cables. The wireless access point is configured to communicate with one or more wireless client devices, such a laptop computers, PDAs, and so forth, allowing the wireless client devices to access the network. The main function of the wireless access point is to form a bridge between the wireless client devices and the hardwired network.

In order to communicate with the wireless client devices, the wireless access point operates on a single channel. The channel may be selected by a network administrator, for example, when the wireless network is set up or may be set to a default channel. Once a channel is selected and a wireless access point is available for network communications, the wireless access point transmits a beacon that identifies the wireless access point to potential wireless client devices. The wireless client devices then scan the available channels to determine which channel is being used by a specific wireless access point as indicated by the beacon. Once a wireless client device finds a suitable wireless access point (one with which the wireless client device can and wants to communicate), a wireless network connection may be established between the wireless access point and the wireless client device.

Unfortunately, as the number of wireless local area networks (WLANs) increases and the transmission coverage area of WLANs continues to grow, the amount of interference on a given WLAN may also increase. Interference on a WLAN may be due to several interference sources, including disparate wireless access points operating in close physical proximity to one another, electrical current sources and transmission mediums, and other transmission devices operating within the channels and nearby frequencies. For example, cellular telephones and microwave ovens may cause interference on a particular WLAN and cause the data rate of the WLAN to decrease because of packet losses and retransmissions. Wireless client devices operating on the same channel or adjacent channels also may cause the data rate for one or both WLANs to decrease. Interference caused by separate devices operating on adjacent channels may be referred to as co-channel interference or signal overlap bleeding.

What is needed is a process, apparatus, and system that mitigates data rate degradation of wireless communications between a wireless access point and a wireless client. Beneficially, such a process, apparatus, and system would assess the quality of wireless communications between a wireless access point and a wireless client and facilitate communications between the wireless access point and the wireless client using a best communications channel—the channel having the least known interference, if any.

BRIEF SUMMARY OF THE INVENTION

The present invention has been developed in response to the present state of the art, and in particular, in response to the problems and needs in the art that have not yet been fully solved by currently available wireless network systems and wireless access points. Accordingly, the present invention has been developed to provide a process, apparatus, and system for mitigating data rate degradation of wireless communications between a wireless access point and a wireless client that overcome many or all of the above-discussed shortcomings in the art.

An access point mitigation apparatus for mitigating data rate degradation of wireless communications between a wireless access point and a wireless client is provided with a logic unit containing a plurality of modules configured to functionally execute the necessary steps of mitigating data rate degradation of wireless communications between a wireless access point and a wireless client. These modules in the described embodiments include a channel assessment module, a channel selection module, a channel connection module, a channel switching module, and a client notification module.

In one embodiment, the channel assessment module is configured to assess the quality of the wireless communications on a plurality of channels. The channel assessment module may monitor and measure any interference activity that is present on any given channel, assessing the time duration, power level, source type, or any other characteristic of the interference signal or source. The channel selection module, in one embodiment, is configured to select the best communications based on the channel assessment performed by the channel assessment module. The channel selection module may select a channel with no known activity or may select a channel with an estimated minimum amount of interference activity.

The channel connection module, in one embodiment, is configured to facilitate a new connection between the wireless access point and a wireless client device on the new best channel. If wireless communications are in progress at the time of the assessment and selection, the channel switching module may facilitate discontinuing previous wireless communications prior to commencing wireless communications over the new best communications channel. In one embodiment, the channel switching module may wait until ongoing wireless communications are completed. In an alternate embodiment, the channel switching module may temporarily suspend the ongoing wireless communications in order to facilitate the channel switch.

The client notification module, in one embodiment, is configured to notify the wireless client device that the wireless access point will be switching wireless communications to the new best communications channel. The notification may include instructions concerning the switching process, such as how ongoing wireless communications will be handled, as well as information regarding when the wireless access point will begin communicating on the new best communications channel.

A system of the present invention is also presented for mitigating data rate degradation of wireless communications between a wireless access point and a wireless client. The system may be embodied in a wireless local area network (WLAN). In particular, the system, in one embodiment, includes a network server, a wireless access point, a channel assessment module, a channel selection module, and a channel connection module.

In one embodiment, the wireless access point is configured to communicate with the network server and with a wireless client device. The channel assessment, channel selection, and channel connection modules are substantially similar to those described above with reference to the apparatus.

In a further embodiment, the wireless access point may be configured to notify the wireless client device of an anticipated channel switch. The wireless client device may be configured to receive the notification from the wireless access point and facilitate the channel switch to minimize network connection downtime and packet losses. For example, instead of scanning all of the available channels for the wireless access point beacon to find the new best channel, the wireless client device may proactively switch to the new best channel at approximately the time designated by the wireless access point. Alternately, the wireless client device simply may scan the available communication channels after losing wireless communications with the wireless access point in order to find the wireless access point beacon.

A client mitigation apparatus is also presented for mitigating data rate degradation of wireless communications between a wireless access point and a wireless client. The client mitigation apparatus is provided with a logic unit containing a plurality of modules configured to functionally execute the necessary steps of mitigating data rate degradation of wireless communications between a wireless access point and a wireless client. These modules in the described embodiments include a notification module and channel switching module.

In one embodiment, the notification module is configured to receive a notification from the wireless access point regarding an anticipated channel switch. The channel switching module, in one embodiment, is configured to facilitate wireless communications on the new best channel by discontinuing previous wireless communications, either by completing or temporarily suspending the ongoing communications, and establishing a new wireless communication over the new best channel.

A process of the present invention is also presented for mitigating data rate degradation of wireless communications between a wireless access point and a wireless client. The process in the disclosed embodiments substantially includes the steps necessary to carry out the functions presented above with respect to the operation of the described apparatus and system. In one embodiment, the process includes assessing the available wireless communication channels, selecting a best communications channel based on the channel assessment, and facilitating wireless communications on the new best channel. In a further embodiment, the process includes notifying a wireless client device of the anticipated channel switch.

A computer readable medium is also present for mitigating data rate degradation of wireless communications between a wireless access point and a wireless client. In one embodiment, the computer readable medium includes computer readable code that is configured to carry out the process described above, including assessing the available wireless communication channels, selecting a best communications channel based on the channel assessment, and facilitating wireless communications on the new best channel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
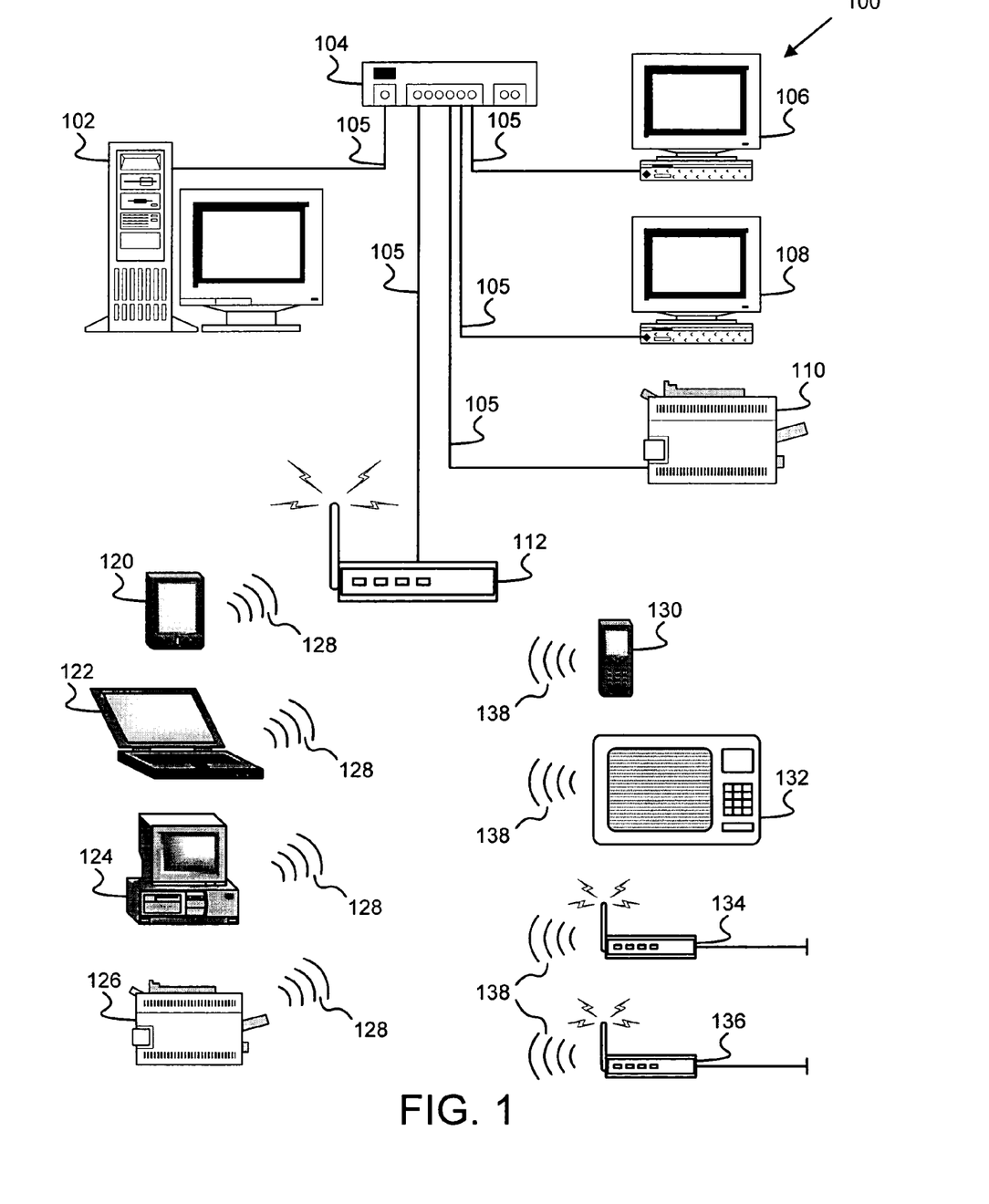
FIG. 1 is a schematic block diagram illustrating one embodiment of a networking system in accordance with the present invention.

FIG. 1 depicts a network system 100 that may be employed in conjunction with the present invention. The illustrated network system 100 includes a network server 102 that is connected to a network hub 104 via a network communications channel 105. The network hub 104 further receives network connections from client workstations 106, 108, a network printer 110, and a wireless access point 112. The client workstations 106, 108, network printer 110, and wireless access point 112 are each connected to the network hub 104 via a network communications channel 105, such as twisted-pair, fiber optic, or another type of communications channel conventionally known in the art.

The wireless access point 112 is configured to transmit and receive wireless network communications 128 in order to communicate network data with other devices that may not be connected to the network server 102 or network hub 104 via a hardwire connection. For example, the depicted network system 100 includes a personal digital assistant (PDA) 120, a laptop computer 122, a client workstation 124, and a network printer 126. Each of these network components is configured to communicate with the network server 102 via the wireless network communications 128 with the wireless access point 112.

For example, conventional wireless technology employs IEEE 802.11 wireless communications, which describes a standard for wireless local area network (WLAN) systems, such as the network system 100. However, other wireless signal sources may cause interference signals that disrupt the network communications of the network system 100. For example, a cordless telephone 130 that is used in close proximity to the wireless access point 112 or a wireless client 120, 122, 124, 126 may cause an interference signal 138 that corrupts the wireless network communications 128. Similarly, a microwave oven 132 may cause an interference signal 138 that corrupts or otherwise disrupts the wireless network communications 128.

Independent wireless access points 134, 136 that are not connected to the network system 100 may also cause interference signals 138 that interfere with the wireless network communications 128 of the network system 100. For example, the independent wireless access point 134 may be transmitting on the same channel or on a channel adjacent to, or otherwise overlapping, the channel used by the wireless access point 112 of the network system 100. The transmission signals 138 from the independent wireless access point 134, although possibly transmitting useful network information for an independent network system (not shown), may cause interference signals 138 with respect to the illustrated network system 100.

The interference signals 138 caused by each of the interference sources 130, 132, 134, 136 may have a disparate impact on the wireless network communications 128 of the network system 100. The interference impact of each of the individual interference signals 138 may depend on the time duration and periodicity of the interference signal 138, as well as the distance between the interference source 130, 132, 134, 136 and the wireless access point 112 or client 120, 122, 124, 126. Other characteristics of an interfering signal 138 may also influence the potential interference impact. Additionally, it maybe possible to determine the type of interference source 130, 132, 134, 136 causing a particular interference signal 138 based on the characteristics of the interference signal 138.

Figure 2:
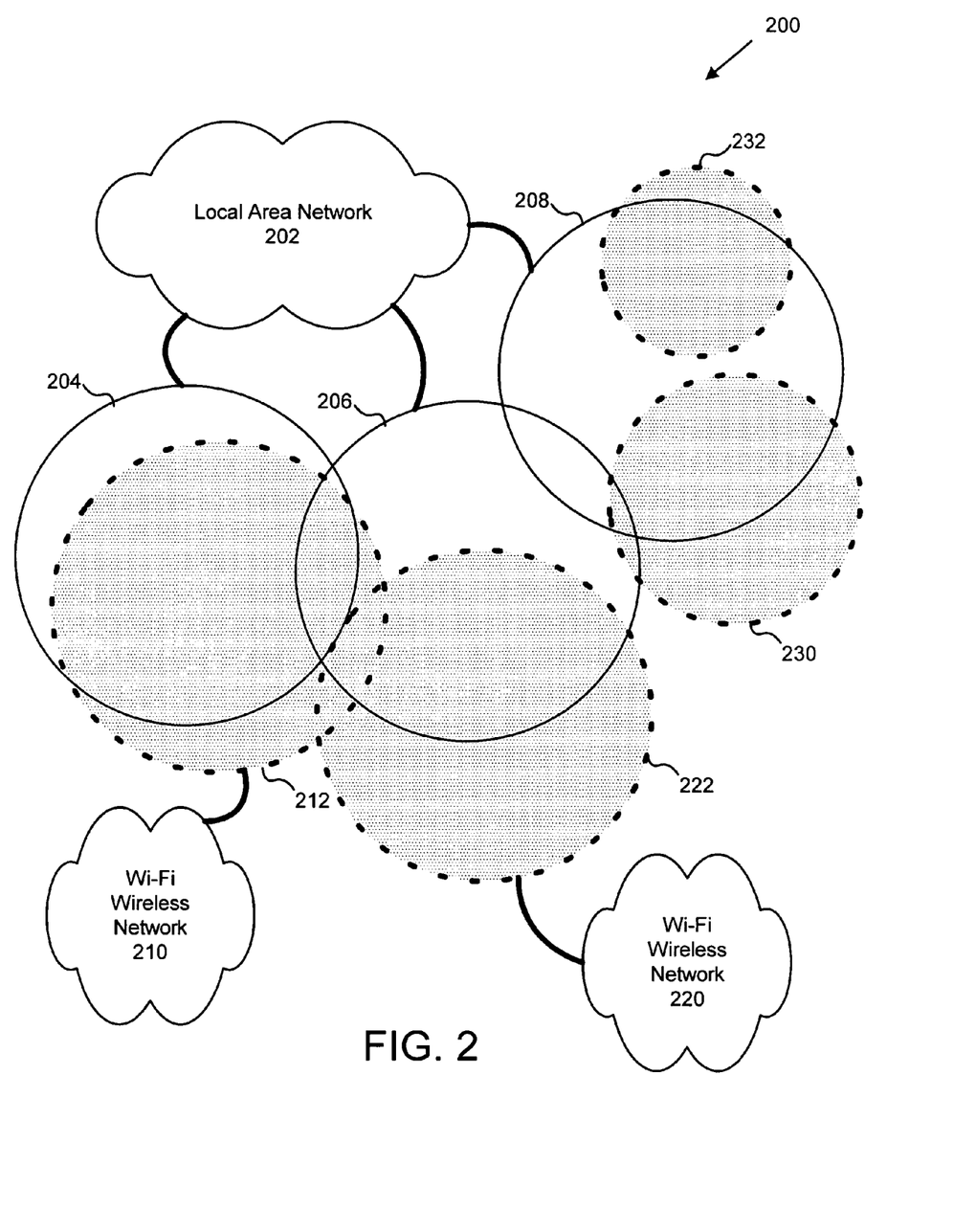
FIG. 2 is a schematic block diagram illustrating one embodiment of a wireless signal distribution in accordance with the present invention.

FIG. 2 depicts a wireless signal distribution 200 that illustrates a plurality of overlapping wireless signal distributions in time and space. In general, a wireless signal distribution defines a space in which a transmitted wireless signal may be received or may interfere with other wireless devices. A wireless signal distribution also may change over time due to alterations in transmission power, changes in transmission source location, receiver bandwidth, and so forth.

In the illustrated embodiment, a local area network (LAN) 202 may have wireless access points 112 that generate multiple wireless network signal distributions 204, 206, 208. Generally, each access point 112 generates a corresponding wireless network signal distribution 204, 206, 208. For example, the first wireless network signal distribution 204 is shown as a circle that represents a space, such as a radial distance from the access point 112, in which a wireless network signal 128 might be present at some time due to a wireless access point 112. The second and third wireless network signal distributions 206, 208 are substantially similar to the first wireless network signal distribution 204. A wireless network signal distribution 204, 206, 208 also may be defined by a client 120, 122, 124, 126, rather than a wireless access point 112.

In the depicted embodiment, an independent wireless network 210 creates a wireless interference signal distribution 212 that overlaps portions of the first and second wireless network signal distributions 204, 206. Similarly, another independent wireless network 220 creates a wireless interference signal distribution 222 that overlaps a portion of the second wireless network signal distribution 206. The wireless interference signals 212, 222 generated by the independent wireless networks 210, 220 may also interfere with one another (the overlapping portion of the distributions 212, 222). The present invention is employed to mitigate data rate degradation on the local area network (LAN) 202 independent of the other wireless networks 210, 220.

The depicted embodiment of FIG. 2 also illustrates other wireless interference signal distributions 230, 232 that may correspond to other interference sources, such as the cordless telephone 130 or the microwave oven 132 of FIG. 1. In any case, FIG. 2 illustrates the potential for various wireless interference signal distributions 212, 222, 230, 232 that may wholly or partially overlap with the wireless network signal distributions 204, 206, 208. As stated above, the present invention is directed to mitigating data rate degradation of the wireless network communications 128 that may be negatively impacted by the wireless interference signals 138 generated by one or more interference sources 130, 132, 134, 136.

Figure 3:
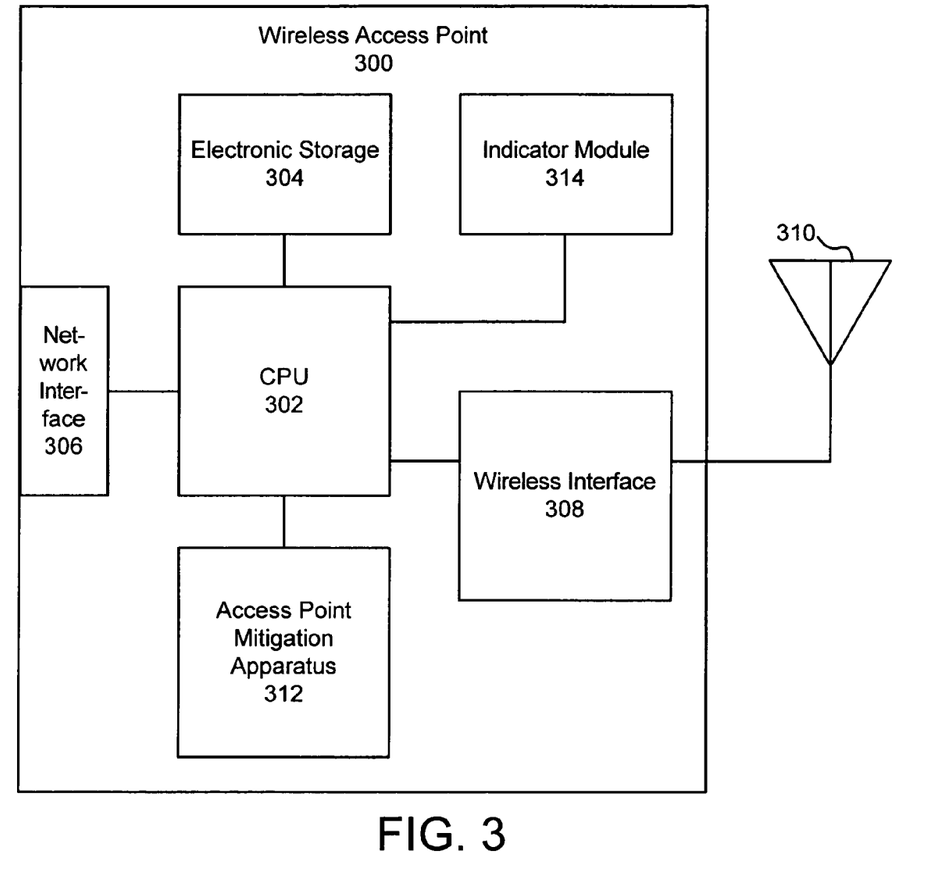
FIG. 3 is a schematic block diagram illustrating one embodiment of a wireless access point in accordance with the present invention.

FIG. 3 depicts one embodiment of a wireless access point 300 that is substantially similar to the wireless access point 112 of FIG. 1. The wireless access point 300 maybe employed in the network system 100 of FIG. 1 to mitigate data rate degradation due to wireless interference signals 138. The illustrated wireless access point 300 includes a central processing unit (CPU) 302, an electronic storage 304, a network interface 306, a wireless interface 308, a wireless transceiver 310, an access point mitigation apparatus 312, and an indicator module 314.

The CPU 302 is configured to process data according to control instructions that may be stored in the electronic storage 304. The CPU 302 is also configured to transmit data between the network interface 306 and the wireless interface 308. The electronic storage 304 is configured to store control instructions 304. The electronics storage 304 may be further configured to store data related to the mitigation of data rate degradation. The network interface 306 is configured to allow a network connection to the network server 102 via a network communications channel 105.

The wireless interface 308 is configured to process wireless network communications 128 by way of transmitting and receiving wireless network communications 128 using the wireless transceiver 310. The wireless interface 308 and wireless transceiver 310, in one embodiment, are configured to transmit and receive wireless network communications 128 on one of a plurality of transmission channels, such as the channels defined by the IEEE 802.11 protocol.

The access point mitigation apparatus 312 is configured, in one embodiment, to mitigate data rate degradation by communicating with a client 120, 122, 124, 126 on a channel that has no interference or, if all channels have some interference, minimum interference. The access point mitigation apparatus 312 preferably resides on the wireless access point 300, as shown, and may be configured to operate independent of or in conjunction with a client 120, 122, 124, 126.

Figure 4:
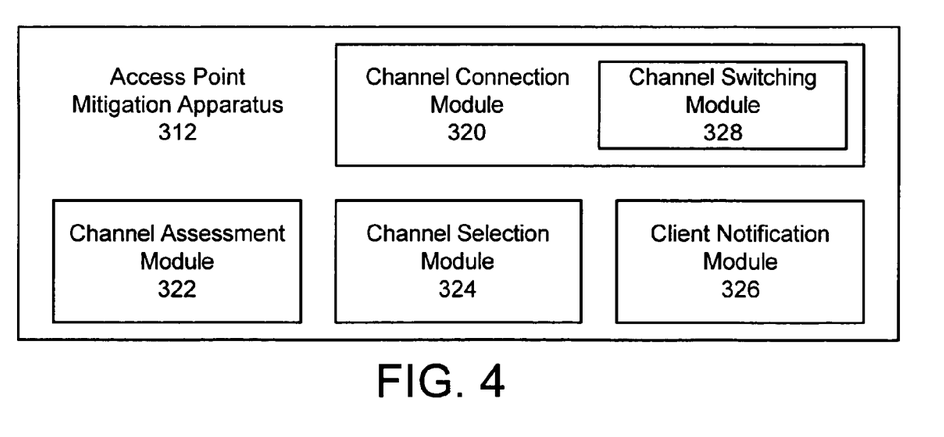
FIG. 4 is a schematic block diagram illustrating one embodiment of an access point mitigation apparatus in accordance with the present invention.

FIG. 4 depicts one embodiment of the access point mitigation apparatus 312 of FIG. 3. The illustrated access point mitigation apparatus 312 includes a channel connection module 320, a channel assessment module 322, a channel selection module 324, and a client notification module 326. In one embodiment, the channel connection module 320 further includes a channel switching module 328.

The channel assessment module 322 is configured to assess the quality of wireless communications on each of the communications channels. In one embodiment, the channel assessment module 322 may establish a communications quality parameter to describe the wireless communications quality on each communications channel. In establishing the communications quality parameter for a given communications channel, the channel assessment module 322 may take into account the presence of an interference signal 138, if any, as well as the strength, duration, and other characteristics of the interference signal 138. The channel assessment module 322 also may determine the type of interference source 130, 132, 134, 136. The channel assessment module 322 may store the communications quality parameters and other data in the electronic storage 304.

The channel selection module 324 is configured to select a best communications channel from the plurality of available communications channels. In one embodiment, the channel selection module 324 may use the communications quality parameters established by the channel assessment module 322 in order to select the best communications channel.

The channel connection module 320 is configured to communicate with a client 120, 122, 124, 126 over the best communications channel via the wireless interface 308 and wireless transceiver 310. If the wireless access point 300 has been communicating with the client 120, 122, 124, 126 previously, the channel switching module 328 may facilitate the switch from a previous channel to the new best channel in a manner that minimizes the loss of data that is being communicated at approximately the time of the switch. In one embodiment, the channel switching module 328 may temporarily suspend the wireless communications 128 until the switch is complete.

The client notification module 326 is configured, in one embodiment, to notify the client 120, 122, 124, 126 that the wireless access point 300 will be switching to a new best communications channel. In this way, a client 120, 122, 124, 126 may be able to anticipate the channel switch and minimize any negative impact, such as lost packets, of the channel switch. In one embodiment, the client notification module 326 also may communicate details of the temporary suspension of wireless communications in a way that allows the client 120, 122, 124, 126 to coordinate the transmission of data packets with the planned suspension of the wireless communications 128.

Figure 5:
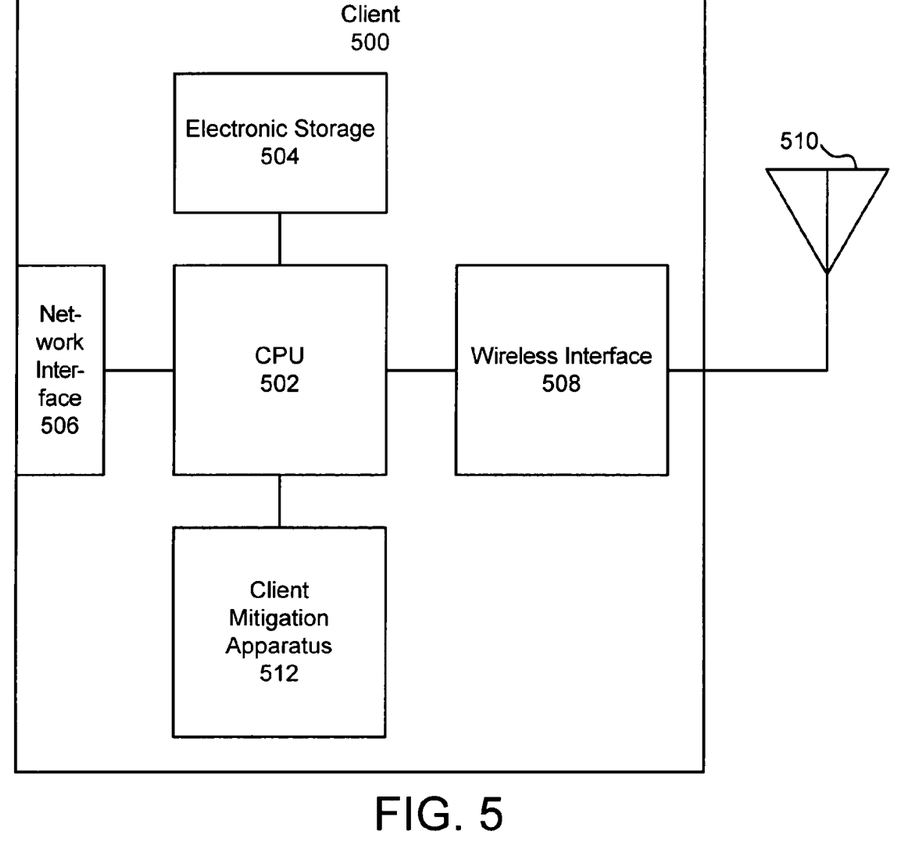
FIG. 5 is a schematic block diagram illustrating one embodiment of a client in accordance with the present invention.

FIG. 5 depicts one embodiment of a client 500 that is substantially similar to the clients 120, 122, 124, 126 of FIG. 1. The illustrated client 500 has a CPU 502, an electronic storage 504, a network interface 506, a wireless interface 508, and a wireless transceiver 510 that are substantially similar to the CPU 302, electronic storage 304, network interface 306, wireless interface 308, and wireless transceiver 310 of the wireless access point 300 of FIG. 3. The client 500 also includes a client mitigation apparatus 512 that is described in more detail with reference to FIG. 6.

Figure 6:
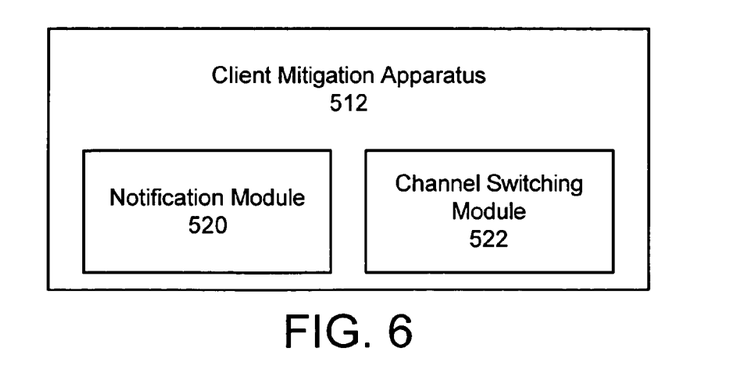
FIG. 6 is a schematic block diagram illustrating one embodiment of a client mitigation apparatus in accordance with the present invention.

FIG. 6 depicts one embodiment of the client mitigation apparatus 512 of FIG. 5. The illustrated client mitigation apparatus 512 includes a notification module 520 and a channel switching module 522.

The notification module 520 is configured, in one embodiment, to receive a notification from the wireless access point 300 that the wireless access point 300 will be switching to a new best communications channel. In a further embodiment, the notification module 326 also may receive details regarding a temporary suspension of the wireless communications 128 in a way that allows the client 120, 122, 124, 126 to coordinate the transmission of data packets with the planned suspension of the wireless communications 128, as described above.

The channel switching module 522, in one embodiment, may facilitate the switch from a previous channel to the new best channel in a manner that minimizes loss of data that is being communicated between the client 500 and the wireless access point 300 at approximately the time of the switch. In a further embodiment, the channel switching module 522 may temporarily suspend the wireless communications 128 until the switch is complete.

Figure 7:
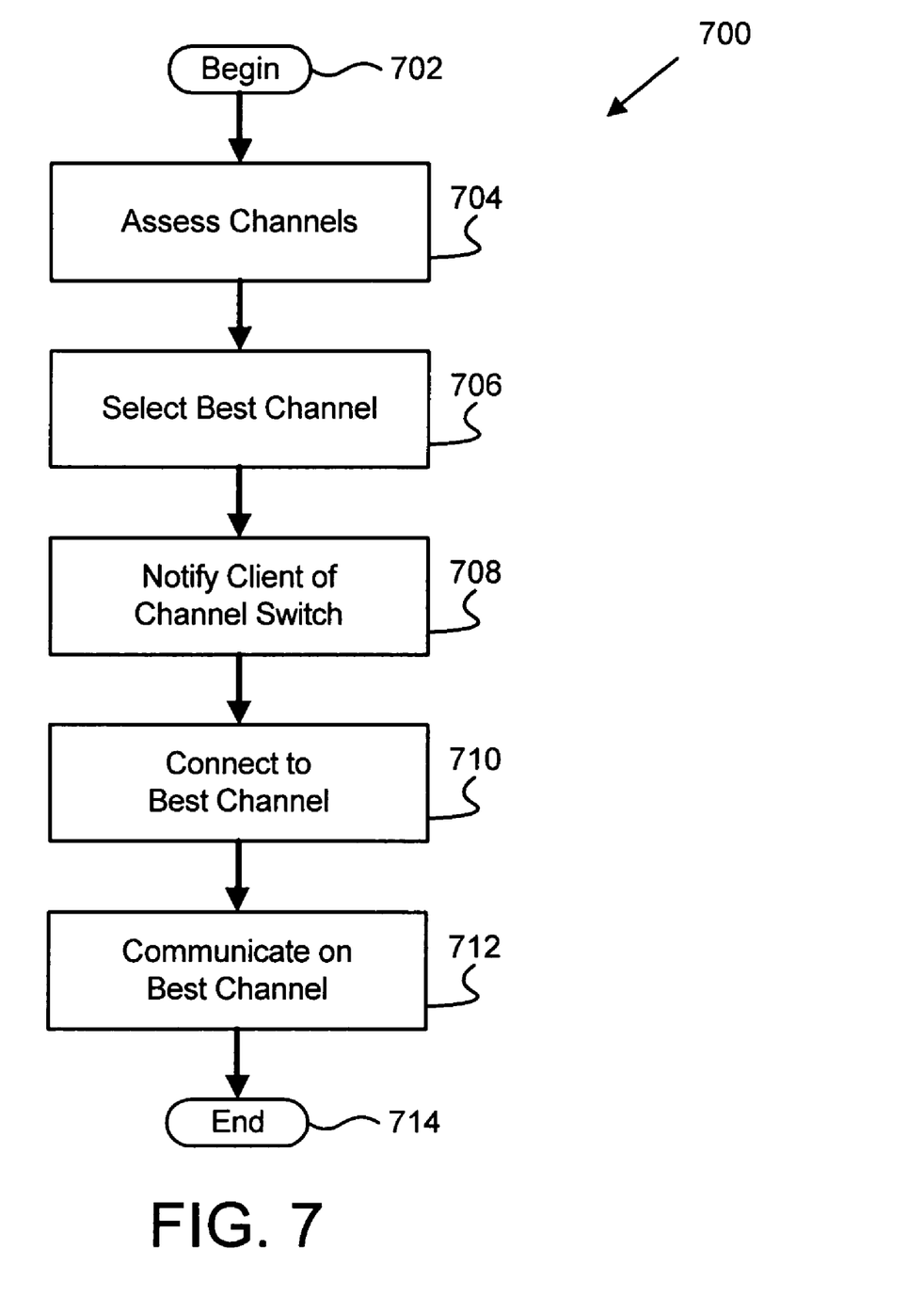
FIG. 7 is a schematic flow chart diagram illustrating one embodiment of a mitigation process in accordance with the present invention.

FIG. 7 depicts one embodiment of a mitigation process 700 that may be implemented by the access point mitigation apparatus 512 of FIG. 4. The illustrated mitigation process 700 begins 702 by assessing 704 the communications quality of the available communications channels. In one embodiment, the channel assessment module 322 may be employed to assess 704 the quality of the channels.

Using the communications quality parameters, the mitigation process 700 continues to select 706 the best communications channel. As described above, the channel selection module 324 may be employed to select 706 the best communications channel based on one or more channel quality characteristics or parameters. Preferably, the channel selection module 324 selects 706 a channel that has no known interference signals 138.

Otherwise, if all of the channels have some interference signals 138 present, the channel selection module 324 may select the channel with the least interference, as determined by strength, periodicity, duration, or one or more of these and other characteristics of the interference signals 138. The channel selection module 324 also may take into account the wireless communication needs of each client 500 or of the network system 100 as a whole.

In the depicted embodiment, the mitigation process 708 notifies 708 the client 500 that a channel switch will occur. The channel notification module 326, in one embodiment, may notify 708 the client 500 of the anticipated time at which the wireless access point 300 intends to begin communicating on the new best channel. In an alternate embodiment of the mitigation process 700, the access point mitigation apparatus 312 may withhold notification from the client 500, requiring the client 500 to scan the available channels and find the new best channel on which the wireless access point 300 may be communicating.

After notifying 708 the client 500 or withholding notification from the client 500, the illustrated mitigation process 700 connects 710 the wireless access point 300 to the new best channel and communicates 712 data on the new best channel. In one embodiment, connecting 710 the wireless access point 300 to the new best channel includes employing conventional techniques to transmit on a frequency corresponding to a single channel. In a further embodiment, connecting 710 the wireless access point 300 to the new best channel also may include discontinuing wireless communications on a previous wireless communications channel. The illustrated mitigation process 700 then ends 714.

Figure 8:
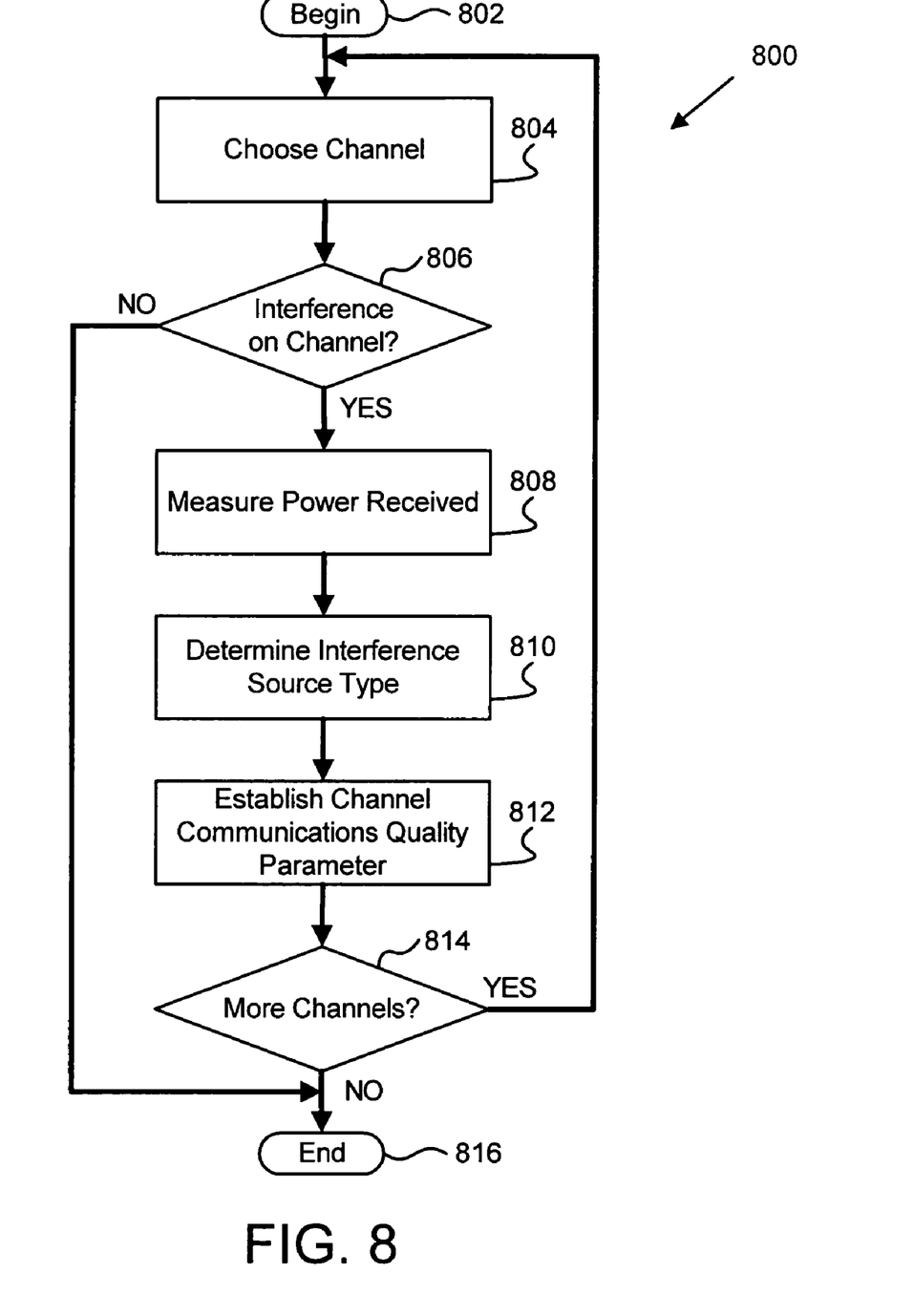
FIG. 8 is a schematic flow chart diagram illustrating one embodiment of a channel assessment process in accordance with the present invention.

FIG. 8 depicts one embodiment of a channel assessment process 800 given by way of example of the channel assessment step 704 of FIG. 7. The illustrated channel assessment process 800 begins 802 by choosing 804 a specific communications channel and monitoring the channel for interference signals 138. In one embodiment, the channel assessment module 322 may monitor a single communications channel for a given time duration. The channel assessment process 800 determines 806 if there is any interference on the chosen channel. If interference signals 138 are not detected on the chosen channel, the depicted channel assessment process 800 may store a record indicating that the chosen channel has no known interference signals 138 and then the channel assessment process 800 ends 816. There may be no reason to continue assessing channels if a channel has been found that is free from interference signals 138. In an alternate embodiment, the channel assessment process 800 may assess all of the available communications channels even if one channel is found to have no known interference signals 138.

If interference signals 138 are detected on the chosen channel, the channel assessment module 322 may be further configured to measure 808 the power received for one or all interference signals 138 received on the monitored channel. The channel assessment module 322 also may determine 810 the type of interference source 130, 132, 134, 136 causing a particular interference signal 138. Additionally, the channel assessment process 800 may monitor and record other channel characteristics that may indicate or predict the presence of interference signals 138 on the monitored channel. Finally, the channel assessment process 800 establishes 812 a channel communications quality parameter for the monitored channel and may store the channel communication quality parameter in memory, Which may be resident, for example, in the electronic storage 304 of the wireless access point 300.

The channel assessment process 800 preferably monitors and assesses all of the available communications channels. In one embodiment, the channel assessment process 800 may sequentially assess the available channels. In another embodiment, the channel assessment process 800 may randomly assess the available channels. In a further embodiment, the channel assessment process 800 may continually assess one or more of the available channels, given the requisite assessment components within the wireless access point 300. After assessing all of the available channels at least once, the illustrated channel assessment process 800 then ends 816.

The channel assessment process 800 may be invoked by the access point mitigation apparatus 312 under one or more of the following scenarios. First, the channel assessment process 800 may be invoked at the initial start up of a network connection between a wireless access point 300 and a wireless client 500. In another embodiment, the access point mitigation apparatus 312 may track changes in the data rate of the wireless network communications 128 and invoke the channel assessment process 800 when the data rate decreases. For example, the channel assessment process 800 may be invoked when the data rate decreases a specified percentage or when the data rate falls below a predetermined data rate threshold. In a further embodiment, the channel assessment process 800 may be invoked periodically or randomly by the access point mitigation apparatus 312.

Figure 9:
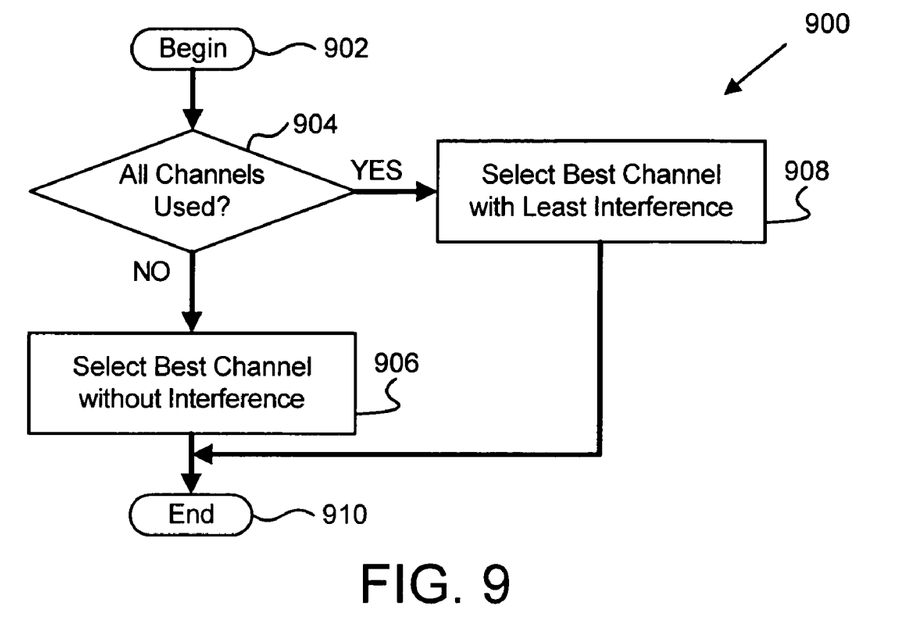
FIG. 9 is a schematic flow chart diagram illustrating on embodiment of a best channel selection process in accordance with the present invention.

FIG. 9 depicts one embodiment of a channel selection process 900 given by way of example of the channel selection step 706 of FIG. 7. The illustrated channel selection process 900 begins 902 by determining 904 if all channels are being used by at least one wireless device. In other words, the channel selection process 900 determines 904 if there are interference signals 138 on each of the available communications channels.

If some of the channels do not have known interference signals 138, the channel selection process 900 selects 906 a best communications channel from the channels without interference signals 138. In one embodiment, the channel selection process 900 may use a selection criterion for selecting 906 the best communications channel. Alternately, the channel selection process 900 may select a best communications channel from among the interference-free channels in a random or pseudo-random manner. Otherwise, if all of the channels have at least some interference, the channel selection process 900 selects 908 a best communications channel having a minimum amount of interference, such as very low power levels, short or infrequent interference transmissions, and so forth. The illustrated channel selection process 900 then ends 910.

Figure 10:
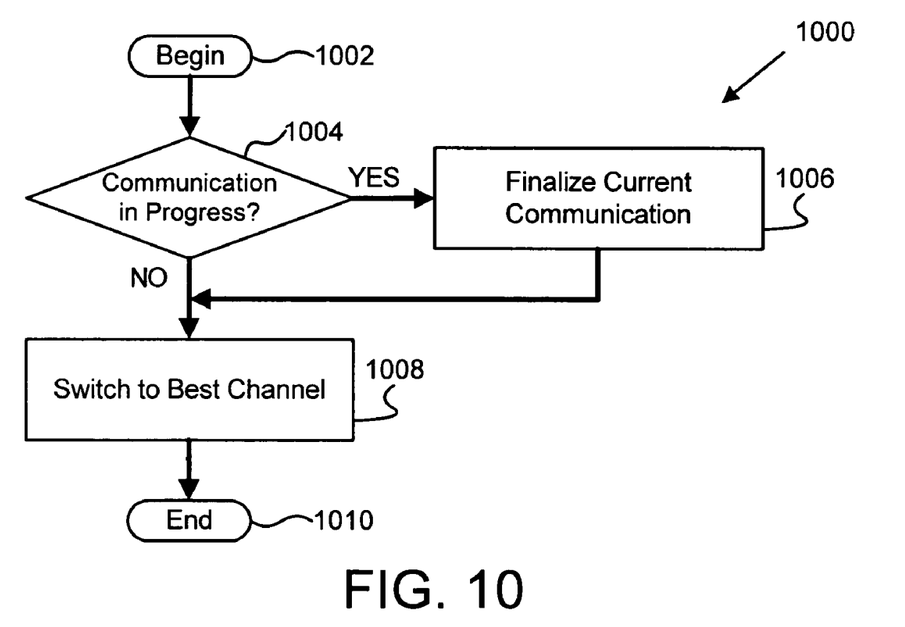
FIG. 10 is a schematic flow chart diagram illustrating one embodiment of a channel connection process in accordance with the present invention.

FIG. 10 depicts one embodiment of a channel connection process 1000 given by way of example of the channel connection step 710 of FIG. 7. The illustrated channel connection process 1000 begins 1002 by determining 1004 if any wireless communications 128 are currently in progress. In one embodiment, the channel connection process 1000 also may determine 1004 if any wireless communications 128 are expected to begin.

If ongoing wireless communications 128 are recognized, the channel connection process 1000 may employ the channel switching module 326 to finalize 1006 the ongoing wireless communications 128 prior to switching 1008 to a new best channel. Alternately, the channel switching module 326 may temporarily suspend the ongoing wireless communications 128 for a predetermined time. Otherwise, if there are no current wireless communications 128 in progress, the channel connection process 1000 simply connects 1008 to a new best channel as described above. The illustrated channel connection process 1000 then ends 1010.

Figure 11:
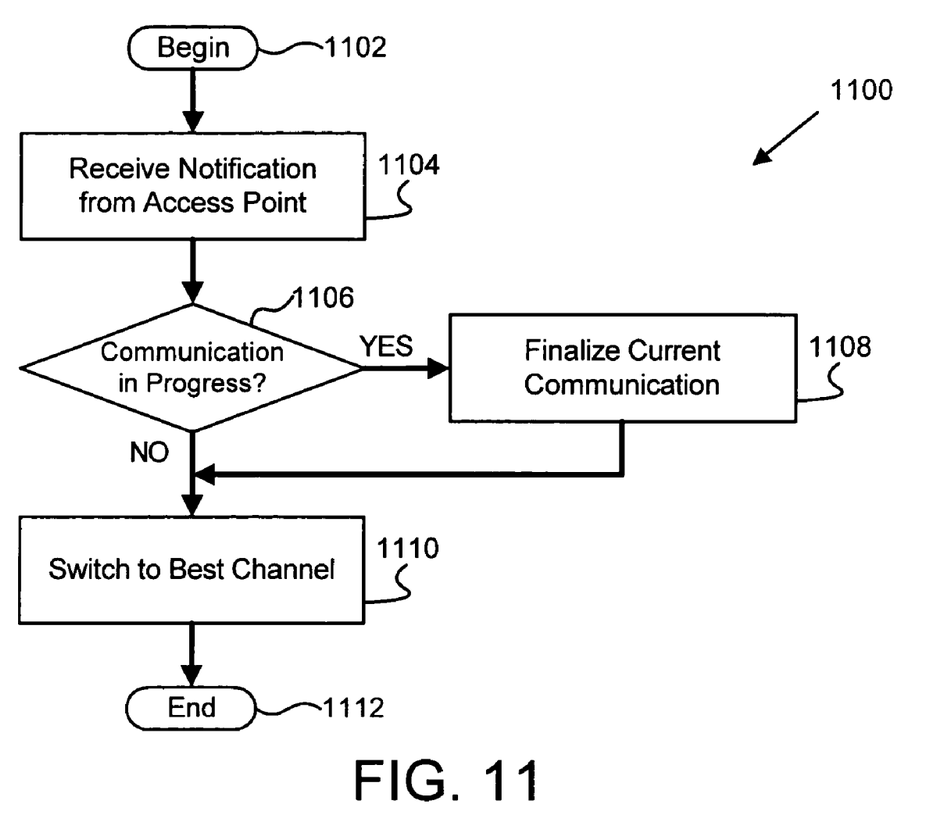
FIG. 11 is a schematic flow chart diagram illustrating one embodiment of a client connection process in accordance with the present invention.

FIG. 11 depicts one embodiment of a client connection process 1100 that may be implemented by the client 500 of FIG. 5. The illustrated client connection process 1100 begins 1102 by receiving 1104 a notification from the wireless access point 300 regarding a planned channel switch. If the client 500 does not receive 1104 a notification, then the client 500 cannot anticipate the channel switch and is only able to react to a channel switch after determining that the wireless connection with the wireless access point 300 has been lost. In this case, the client 500 may employ conventional techniques to scan the available wireless communications channels and find the channel, if any, that the wireless access point 300 is using to communicate wireless network data 128.

After receiving 1104 a notification of the channel switch from the wireless access point 300, the client connection process 1100 determines 1106 if any wireless communications 128 are currently in progress. In one embodiment, the client connection process 1100 also may determine 1106 if any wireless communications 128 are expected to begin.

If ongoing wireless communications 128 are recognized, the client connection process 1100 may employ the channel switching module 522 of the client mitigation apparatus 512 to finalize 1108 the ongoing wireless communications 128 prior to switching 1110 to a new best channel. Alternately, the channel switching module 522 may temporarily suspend the ongoing wireless communications 128 for a predetermined time. Otherwise, if there are no current wireless communications 128 in progress, the client connection process 1100 simply connects 1110 to a new best channel as described above. The illustrated client connection process 1100 then ends 1112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An access point mitigation apparatus for mitigating access point data rate degradation with respect to a wireless communication between an access point and a client, the access point mitigation apparatus comprising:

a channel assessment module configured to assess a plurality of communications channels and maintain plurality of communications quality parameters, each communications quality parameter associated with one of the plurality of communications channels, the channel assessment module further configured to update the plurality of communications quality parameters in response to identifying a type of interference source based on the characteristics of an interference signal present on one of the plurality of wireless communications channels;

a channel selection module configured to select a best wireless communications channel from the plurality of communications channels based on the plurality of communications quality parameters; and a channel connection module configured to facilitate a new wireless communication between the access point and the client over the best wireless communications channel.

2. The access point mitigation apparatus of claim 1, wherein the channel assessment module is further configured to update the plurality of communications quality parameters in response to assessing a power intensity and a duration of an interfering signal present on one of the plurality of wireless communications channels.

3. The access point mitigation apparatus of claim 1, wherein identifying a type of interference source based on the characteristics of an interference signal comprises determining a correlation between the characteristics of the interference signal and characteristics produced by interference sources selected from the group consisting of a microwave oven, a cellular phone, an access point, a personal digital assistant, a desktop computer, a printer with a wireless adapter and a laptop.

4. The access point mitigation apparatus of claim 1, further comprising a client notification module configured to notify the client of the best wireless communications channel selected.

5. The access point mitigation apparatus of claim 1, further comprising a channel switching module configured to discontinue a previous wireless communication with the client over a previous wireless communications channel prior to facilitating the new wireless communication between the access point and the client over the best wireless communications channel, wherein the previous wireless communications channel is one of the plurality of communications channels that is not the best communications channel.

6. The access point mitigation apparatus of claim 1, wherein the channel assessment module is further configured to identify one of the plurality of communications channels on which no interference is detected as an interferenee-free channel and to discontinue assessing the plurality of communications channels in response to identifying the interference-free channel and wherein the channel selection module is further configured to select the interference-free channel as the best wireless communications channel.

7. The access point mitigation apparatus of claim 1, wherein the channel assessment module is further configured to assess the plurality of communications channels and establish the plurality of communications quality parameters upon initial startup of the access point.

8. The access point mitigation apparatus of claim 1, wherein the channel assessment module is further configured to periodically assess the plurality of communications channels and update the plurality of communications quality parameters as specified by a user.

9. The access point mitigation apparatus of claim 1, wherein the channel assessment module is further configured to track a plurality of communications quality parameter histories.

10. The access point mitigation apparatus of claim 9, wherein the channel assessment module is further configured to assess the plurality of communications channels and update the plurality of communications quality parameters in response to a decrease in one of the plurality of communications quality parameter histories.

11. The access point mitigation apparatus of claim 1, wherein the channel assessment module is further configured to determine the presence of an interfering signal on one of the plurality of communications channels.

12. A system for mitigating access point data rate degradation with respect to a wireless communication between an access point and a client, the system comprising:

a network server configured to communicate with the access point over a network;

the access point configured to communicate with the client over one of a plurality of communications channels;

a channel assessment module configured to assess the plurality of communications channels and maintain a plurality of communications quality parameters, each communications quality parameter associated with one of the plurality of communications channels, the channel assessment module further configured to update the plurality of communications quality parameters in response to identifying a type of interference source based on the characteristics of an interference signal present on one of the plurality of wireless communications channels;

a channel selection module configured to select a best wireless communications channel from the plurality of communications channels based on the plurality of communications quality parameters; and a channel connection module configured to facilitate the new wireless communication between the access point and the client over the best wireless communications channel.

13. The system of claim 12, wherein the client is configured to scan the plurality of communications channels for the best wireless communications channel selected and to communicate with the access point over the best wireless communications channel.

14. The system of claim 12, wherein the client is configured to receive a notification from the access point of the best wireless communications channel selected and to communicate with the access point over the best wireless communications channel.

15. A client mitigation apparatus for mitigating access point data rate degradation with respect to a wireless communication between an access point and a client the client mitigation apparatus comprising:

a notification module configured to receive a notification of a best wireless communications channel in response to a transmission of a notification signal from the access point, wherein the plurality of communications quality parameters are updated in response to identifying a type of interference source based on the characteristics of an interference signal present on one of the plurality of wireless communications channels; and a channel switching module configured to discontinue a previous wireless communication with the access point over a previous wireless communications channel prior to facilitating a new wireless communication with the access point over the best wireless communications channel.

16. A process for mitigating access point data rate degradation with respect to a wireless communication between an access point and a client, the process comprising:
assessing a plurality of communications channels;
maintaining a plurality of communications quality parameters, each communications quality parameter associated with one of the plurality of communications channels, wherein the plurality of communications quality parameters are updated in response to identifying a type of interference source based on the characteristics of an interference signal present on one of the plurality of wireless communications channels;
selecting a best communications channel from the plurality of communications channels based on the plurality of communications quality parameters; and
facilitating a new wireless communication between the access point and the client over the best communications channel.

17. The process of claim 16, further comprising notifying the client of the best wireless communications channel selected.

18. The process of claim 16, further comprising discontinuing a previous wireless communication with the client over a previous wireless communications channel prior to facilitating the new wireless communication with the client over the best wireless communications channel, wherein the previous wireless communications channel is one of the plurality of communications channels that is not the best communications channel.

19. The process of claim 16, further comprising identifying one of the plurality of communications channels on which no interference is detected as an interference-free channel, discontinuing assessing the plurality of communications channels in response to identifying the interference-free channel, and selecting the interference-free channel as the best wireless communications channel.

20. A process for mitigating access point data rate degradation with respect to a wireless communication between an access point and a client, the process comprising:
monitoring and assessing a plurality of communications channels;
maintaining a plurality of communications quality parameters, each communications quality parameter associated with one of the plurality of communications channels;
selecting a best wireless communications channel from the plurality of communications channels based on the plurality of communications quality parameters, wherein the plurality of communications quality parameters are updated in response to identifying a type of interference source based on the characteristics of an interference signal present on one of the plurality of wireless communications channels;
notifying the client of the best wireless communications channel selected;
discontinuing a previous wireless communication with the client over a previous wireless communications channel; and
facilitating a new wireless communication between the access point and the client over the best wireless communications channel.

21. A computer readable storage medium comprising computer readable code configured to carry out a process for mitigating access point data rate degradation with respect to a wireless communication between an access point and a client, the process comprising:
assessing a plurality of communications channels;
maintaining a plurality of communications quality parameters, each communications quality parameter associated with one of the plurality of communications channel, wherein the plurality of communications quality parameters are updated in response to identifying a type of interference source based on the characteristics of an interference signal present on one of the plurality of wireless communications channels:
selecting a best communications channel from the plurality of communications channels based on the plurality of communications quality parameters; and
facilitating a new wireless communication between the access point and the client over the best communications channel.

22. The computer readable medium of claim 21, wherein the process further comprises updating the plurality of communications quality parameters in response to assessing a power intensity and a duration of an interfering signal present on one of the plurality of wireless communications channels.

23. The computer readable medium of claim 21, wherein identifying a type of interference source based on the characteristics of an interference signal comprises determining a correlation between the characteristics of the interference signal and characteristics produced by interference sources selected from the group consisting of a microwave oven, a cellular phone, an access point, a personal digital assistant, a desktop computer, a printer with a wireless adapter, and a laptop.

24. The computer readable medium of claim 21, wherein the process further comprises notifying the client of the best wireless communications channel selected.

25. The computer readable medium of claim 21, wherein the process further comprises discontinuing a previous wireless communication with the client over a previous wireless communications channel prior to facilitating the new wireless communication between the access point and the client over the best wireless communications channel, wherein the previous wireless communications channel is one of the plurality of wireless communications channels that is not the best communications channel.

26. The computer readable medium of claim 21, wherein the process further comprises identifying one of the plurality of communications channels on which no interference is detected as an interference-free channel, discontinuing assessing the plurality of communications channels in response to identifying the interference-free channel, and selecting the interference-free channel as the best network wireless communications channel.

27. The computer readable medium of claim 21, wherein the process further comprises assessing the plurality of communications channels and establishing the plurality of communications quality parameters upon initial startup of the access point.

28. The computer readable medium of claim 21, wherein the process further comprises periodically assessing the plurality of communications channels and updating the plurality of communications quality parameters as specified by a user.

29. The computer readable medium of claim 21, wherein the process further comprises tracking a plurality of communications quality parameter histories.

30. The computer readable medium of claim 29, wherein the process further comprises assessing the plurality of communications channels and updating the plurality of communications quality parameters in response to a decrease in one of the plurality of communications quality parameter histories.

31. The computer readable medium of claim 21, wherein the process further comprises determining the presence of an interfering signal on one of the plurality of communications channels.

32. A computer readable storage medium comprising computer readable code configured to carry out a process for mitigating access point data rate degradation with respect to a wireless communication between an access point and a client, the process comprising:
   monitoring and assessing a plurality of communications channels;
   maintaining a plurality of communications quality parameters, each of the communications quality parameters associated with one of the plurality of communications channels, wherein the plurality of communications quality parameters are updated in response to identifying a type of interference source based on the characteristics of an interference signal present on one of the plurality of wireless communications channels and in response to assessing a power intensity and a duration of an interfering signal present on one of the plurality of wireless communications channels;
   selecting a best wireless communications channel from the plurality of communications channels based on the plurality of communications quality parameters;
   notifying the client of the best wireless communications channel selected;
   discontinuing a previous wireless communication with the client over a previous wireless communications channel; and
   facilitating a new wireless communication between the access point and the client over the best wireless communications channel.

33. An access point mitigation apparatus for mitigating access point data rate degradation with respect to a wireless communication between an access point and a client, the apparatus comprising:
   means for assessing a plurality of communications channels;
   means for establishing a plurality of communications quality parameters, each communications quality parameter associated with one of the plurality of communications channel;
   means for identifying a type of interference source based on the characteristics of an interference signal present on one of the plurality of wireless communications channels;
   means for selecting a best communications channel from the plurality of communications channels based on the plurality of communications quality parameters; and
   means for facilitating a new wireless communication between the access point and the client over the best communications channel.

* * * * *

UNITED STATES PATENT AND TRADEMARK OFFICE
CERTIFICATE OF CORRECTION

PATENT NO. : 7,039,417 B2
APPLICATION NO. : 10/670639
DATED : May 2, 2006
INVENTOR(S) : Ruthie D. Lyle et al.

Page 1 of 1

It is certified that error appears in the above-identified patent and that said Letters Patent is hereby corrected as shown below:

Column 13,
Line 52 - 53 "an interferenee free" should read --an interference free--.

Signed and Sealed this

Third Day of October, 2006

JON W. DUDAS
*Director of the United States Patent and Trademark Office*